UNITED STATES PATENT OFFICE.

LUCIEN DUPONT, OF VINCENNES, FRANCE, ASSIGNOR TO HIMSELF AND SOCIETE DARRASSE FRÈRES, OF PARIS, FRANCE.

PROCESS FOR THE MANUFACTURE OF VALERIANIC ACID AND OF ALKALINE VALERIANATES.

1,389,187.        Specification of Letters Patent.     Patented Aug. 30, 1921.

No Drawing.      Application filed December 20, 1919. Serial No. 346,430.

(GRANTED UNDER THE PROVISIONS OF THE ACT OF MARCH 3, 1921, 41 STAT. L., 1313.)

*To all whom it may concern:*

Be it known that I, LUCIEN DUPONT, a citizen of the Republic of France, residing in Vincennes, Seine, France, have invented certain new and useful Improvements in a Process for the Manufacture of Valerianic Acid and of Alkaline Valerianates, (for which I have filed an application in France, Dec. 3, 1918, Patent No. 501,350,) of which the following is a specification.

The invention relates to a new process for the manufacture of valerianic acid and of alkaline valerianates.

It has been known for a long time that amyl alcohol on being brought, at a temperature of 200° C., in contact with caustic potash, produced valerianate of potash in accordance with the following reaction:

$$C_5H_{12}O + KOH = C_5H_9O_2K + 4H$$

This reaction which was generally carried out by passing vapors of amyl alcohol over potash in excess, is however difficult to bring about and has not been adopted in industrial practice.

The present invention has for its object to supply a perfect method of manufacture of alkaline valerianates by the following means:

1. By maintaining in a liquid state the amyl alcohol used, so as to take advantage of the solubility of alkalis in the same and thus to insure the best possible contact between the two substances acting on each other, and to that end by carrying out the reaction in an apparatus provided with an easily adjustable orifice for the discharge of the hydrogen generated, so as to maintain in the apparatus a pressure sufficient to keep the amyl alcohol in a liquid and not gaseous state at the reaction temperature. In these conditions the hydrogen generated does not carry away any vapors of amyl alcohol, or only a very small quantity.

2. By using a quantity of alcohol in excess of the quantity of alkali.

In this way it becomes possible: (*a*) completely to dissolve the alkali; (*b*) and also to dissolve in the excess of alcohol the valerianate formed.

Owing to these means the operation always takes place in a liquid mass, there is always a thorough contact between the substance in reaction, and transmission of the necessary heat is perfect throughout the mass.

There is no sediment, nor any solid portion escaping the reaction owing to interception of the transmission of heat, or to decomposition due to an excess of temperature, as the latter is necessarily uniform throughout the whole liquid mass.

3. By substituting caustic soda NaOH for caustic potash KOH.

This substitution which is advantageous on account of the unit price of soda being lower than that of potash, and of the smaller quantity being required, is possible:

(*a*) Owing to an excess of amyl alcohol being brought into reaction, and (*b*) owing to a slight increase of temperature. Reaction with soda takes place well between 235–250° C.

The excess of amyl alcohol can be easily separated from the valerianate produced, by means of a current of steam; if the temperature be raised too much, ketonic bodies will be formed.

Example: Into an autoclave provided with safety devices and with an adjustable discharge opening, are introduced 200 kg. of amyl-alcohol and 60 kg. of caustic soda NaOH, as pure as possible, air is expelled, the temperature raised to 235–240° C. and the pressure to 18 atmospheres. The temperature and the pressure are maintained constant by means of the regulating apparatus, until the whole soda has been converted. The boiling operation having been completed, the excess of amyl alcohol is eliminated by means of a current of steam. There will be left then a solution of a valerianate of soda from which, unless it be used as such, it is possible to obtain valerianic acid by well known means.

The yield is practically equal to that indicated by theory.

What I claim is:

1. A process for making alkali-valerianates and valerianic acid, comprising heating, under super-atmospheric pressure, caustic soda and amyl-alcohol so as to react to form sodium valerianate, the representative temperature limits being 235–250° C.

2. A process for making alkali-valerianates and valerianic acid, comprising heating caustic soda and amyl-alcohol, so as to react to form sodium valerianate, the representative temperature limits being 235–250° C.

3. A process for making alkali-valerianates and valerianic acid, comprising heating caustic soda and amyl-alcohol so as to react to form sodium valerianate, the representative temperature limits being 235–250° C., the proportions of said caustic soda and amyl-alcohol being such that said caustic soda is completely dissolved in said alcohol.

4. A process for making alkali-valerianates and valerianic acid, comprising heating, under super-atmospheric pressure, caustic soda and amyl-alcohol, so as to react to form sodium valerianate, the representative temperature limits being 235–250° C.

5. A process for making alkali-valerianates and valerianic acid, comprising heating, under super-atmospheric pressure, caustic soda and amyl-alcohol, so as to react to form sodium valerianate, the representative temperature limits being 235–250° C., the proportions of said caustic soda and amyl-alcohol being such that said caustic soda is completely dissolved in said alcohol.

In witness whereof, I have hereunto signed my name in the presence of two subscribing witnesses.

LUCIEN DUPONT.

Witnesses:
HENRY T. WILCOX,
RENÉ BARDY.